3,113,423
TRICYCLO-[7.1.0.0^{4,6}]-DECANE AS A
HIGH ENERGY FUEL
Stanley D. Koch, Swampscott, Mass., assignor, by mesne assignments, to Monsanto Research Corporation, Everett, Mass., a corporation of Delaware
No Drawing. Filed Oct. 10, 1960, Ser. No. 61,372
6 Claims. (Cl. 60—35.4)

This invention relates to tricyclic hydrocarbons. In one aspect, this invention relates to tricyclo-[7.1.0.0$^{4,6}$]-decane as a new compound. In another aspect, this invention relates to methods for preparing tricyclo-[7.1.0.0$^{4,6}$]-decane. In another aspect, this invention relates to high energy fuel compositions for use in reaction type power plants. In another aspect, this invention relates to improved methods of developing thrust. In another aspect, this invention relates to methods of operating reaction type power plants, such as jet propulsion type engines, including rocket, ram-jet, pulse-jet, and turbo-jet engines, and turbine type engines, including turbo-prop and gas turbine engines.

The development of reaction type power plants has been accompanied by the requirement for developing fuels suitable for use in such engines. In the reaction type power plant, fuel and an oxidizing agent are admixed under suitable conditions and in suitable proportions whereby the fuel is oxidized or burned in a pressure-restraining combustion chamber to form a mass of high temperature gases which comprise the fuel combustion products and any excess oxidizing agent. The high temperature gases are exhausted from the combustion chamber at high velocity to produce thrust in accordance with the law of momentum. In a jet-propulsion type engine, such as a rocket, ram-jet, turbo-jet, or pulse-jet engine, exhaustion of the high temperature gases is directed in a rearward direction to produce a true jet propulsion. In a turbine type engine, such as a gas turbine or a turbo-prop engine, the exhaustion of high temperature gases is directed into a turbine which drives a propeller or other mechanical means for developing a forward thrust. Reaction type power plants may be used in widely different types of vehicles such as space-ships, aircraft, boats, guided missiles, automobiles, and the like.

Heretofore, it was believed that many hydrocarbons do not vary sufficiently in their burning characteristics to make a material difference in the operation of reaction type power plants. Although these power plants may be operated under many conditions with substantially any fuel, other conditions of operation encounter operational difficulties and require fuels having particular properties. One difficulty which has been encountered in power plants for high speed vehicles is that many fuels lack thermal stability, resulting in the formation of insoluble gum and other deposits which hamper performance. At high speeds, particularly supersonic speeds of aircraft, the fuel supply must serve to absorb the aerodynamic heat which builds up faster than can be dissipated to the atmosphere. A refrigeration system is not suitable in such applications because of weight and volume limitations. Under some conditions, the fuel will be heated to a temperature as high as 500° F. or higher but the presently available JP-4 fuel is thermally stable to a temperature of only about 400° F. Therefore, it is desirable to have a fuel which is thermally stable at a temperature of at least as high as 500° F.

Another serious disadvantage of the prior art fuels is the low heat of combustion of such fuels. Aircraft generally, and particularly military aircraft, are being designed for higher and higher speeds requiring higher energy level fuels. The fuel must not only have a high energy level on a weight basis, or high B.t.u./pound, but also a high energy level on a volume basis, or high B.t.u./gallon, since wing sections are being made thinner in order to reduce drag and space for storage of fuel is limited. Thus, aircraft are often volume limited as well as weight limited for the storage fuel. Aircraft are particularly volume limited using the currently available JP-6 high energy fuels which has a heat of combustion of 18,400 B.t.u./lb. on a weight basis but a heat of combustion of only 119,500 B.t.u./gal. on a volume basis. Therefore, it is very desirable to provide a high energy fuel having a high heat of combustion on a volume basis, preferably greater than 120,000 B.t.u./gal., and at the same time obtain the other characteristics necessary for a good fuel of this type.

An object of this invention is to provide tricyclo-[7.1.0.0$^{4,6}$]-decane as a new compound.

Another object of this invention is to provide methods for preparing tricyclo-[7.1.0.0$^{4,6}$]-decane.

Another object of this invention is to provide high energy fuel compositions for use in reaction type power plants.

Another object of this invention is to provide improved methods of developing thrust.

Another object of this invention is to provide improved methods of operating reaction type power plants, particularly jet-propulsion type engines, including rocket, ram-jet turbo-jet, and pulse-jet engines, and turbine type engines including, turbo-prop and gas turbine engines.

Other aspects, objects and advantages of this invention will be apparent from the consideration of the accompanying disclosure and the appended claims.

According to the present invention, there is provided, as a new compound, tricyclo-[7.1.0.0$^{4,6}$]-decane.

Also, according to the present invention, there are provided methods for producing tricyclo-[7.1.0.0$^{4,6}$]-decane by carbenating cyclooctadiene, preferably with methylene iodide in the presence of a zinc-copper couple.

Also, according to the present invention, there are provided high energy fuel compositions comprising, as an essential ingredient, tricyclo-[7.1.0.0$^{4,6}$]-decane.

Also, according to the present invention, there are provided improved methods of developing thrust, said methods comprising oxidizing a high energy fuel composition comprising as an essential ingredient, tricyclo-[7.1.0.0$^{4,6}$]-decane with an oxidizing agent in a reaction chamber to produce a mass of high temperature gases and exhausting said gases from said reaction chamber in a manner so as to develop a large amount of thrust.

Also, according to the present invention, there are provided improved methods of operating reaction type power plants, said methods comprising injecting a stream of an oxidizing agent and a stream of a fuel composition comprising, as an essential ingredient, tricyclo-[7.1.0.0$^{4,6}$]-decane into the combustion chamber of said reaction type power plants in such proportion as to produce a combustible mixture, subjecting said combustible mixture to combustion, and exhausting the resulting gases from said combustion chamber so as to impart thrust thereto.

The tricyclo-[7.1.0.0^{4,6}]-decane of the present invention can be illustrated by the following structural formula:

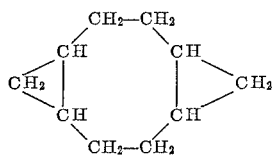

This hydrocarbon is produced by reacting 1,5-cyclooctadiene having the formula

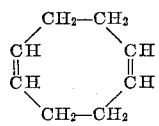

with 2 moles of carbene, i.e., a divalent carbon intermediate, which is preferably generated from methylene iodide and a zinc-copper couple. For general reactions of the carbenes, see, e.g., the papers by W. von E. Doering et al., J. Amer. Chem. Soc. 76, 6162 (1954), and W. Kirmse, Angew Chem. 71, 537 (1959).

The zinc-copper couple is prepared for the reaction by heating a mixture containing from 75% to 95% zinc and, correspondingly, from 25% to 5% copper in a hydrogen atmosphere at a temperature in the range of 425° C. to 475° C. for a period of from 4 to 6 hours. In the formation of the zinc-copper couple, the first part of the reaction is highly exothermic and care must be taken to avoid heating the mixture much above the temperature of 475° C. The reaction is carried out in an inert solvent medium, such as, for example, anhydrous diethyl ether, ethyl acetate, ethylene glycol dimethyl ether, tetrahydrofuran, and the like. Diethyl ether and tetrahydrofuran are preferred. The reaction is conveniently started in the presence of a small amount of iodine; however, the reaction can be conducted without the presence of this activation iodine. The reaction is initially conducted at substantially room temperature, and is continued at reflux temperature for a period of from 24 to 60 hours. This reaction is preferably carried out at atmospheric pressure although subatmospheric and superatmospheric pressures can be used.

The advantages, desirability and usefulness of this invention are illustrated by the following examples.

EXAMPLE 1

A zinc-copper couple was prepared from a mixture of 120 g. of zinc dust and 15 g. of cupric oxide. This admixture was placed in a 8-inch Vycor boat in a ceramic combustion tube and heated in a stream of hydrogen to a temperature of 450° C. over a period of from about 90 to 100 minutes. The temperature of the mixture was carefully determined using three iron-constantan thermocouples inserted into the reaction mixture. The reaction was found to be exothermic and required very careful heating in order to prevent the temperature from going above 475° C. The contents of the Vycor boat were held at a temperature of 425° C. to 450° C. for an additional period of approximately 4 hours in the hydrogen atmosphere. At the end of this time, the mixture was permitted to cool in the hydrogen atmosphere to obtain the zinc-copper couple as a grayish powder.

Reaction with the zinc-copper couple was conducted in a 2000 ml. round-bottomed flask into which was placed 143 g. (2.00 g.-atoms of zinc) of the zinc-copper couple, 1007 ml. of anhydrous diethyl ether which was dried over sodium, and 30.48 g. (0.12 mole) of iodine crystals. Upon the addition of the iodine crystals, a brief exothermic reaction occurred and after this reaction had subsided with the disappearance of the iodine color, 480 g. (1.80 moles) of redistilled methylene iodide and 108 g. (1.00 mole) of 1,5-cyclooctadiene were added together. The resulting mixture was then refluxed for a period of 48 hours. After 24 hours some precipitation of metallic copper was visually evident. At the end of the 48 hours, the reaction mixture was treated with a low-boiling olefin and more zinc-copper couple in order to destroy the excess of methylene iodide. The additional zinc-copper couple, in an amount of 71.5 g. (1.00 g.-atom) of zinc, was added to the mixture followed by 15 g. of iodine crystals. After the initial reaction resulting from the addition of the iodine had subsided, 70 g. (1.00 mole) of 2-methylbutene-2 was added as the olefin and the reaction mixture refluxed for an additional 24 hours. At the end of this time, the mixture was cooled and centrifuged to remove the finely-divided metals. The centrifugate obtained was extracted three times with cold 5% hydrochloric acid, three times with cold 5% sodium bicarbonate solution and 2 times with water. The organic phase obtained was allowed to stand overnight over anhydrous calcium chloride and was then evaporated by a rotary evaporator to remove the solvent. In this evaporation, the pressure was lowered to 27 mm. and the flask was cooled by immersion in ice water. The crude product thus obtained amounted to 108 g.

Vapor phase chromatography showed that this crude product contained unreacted cyclooctadiene. Therefore, the crude product was recycled in the same manner as described above using 803.4 g. (3.00 moles) of methylene iodide, 214.5 g. (3.00 g.-atoms of zinc) of zinc-copper couple, 45.68 g. (0.18 mole) of iodine, and 1.6 liters of diethyl ether. After 48 hours of reflux, 214.5 g. (3.00 g.-atoms) of zinc-copper couple, 45.68 g. (0.18 mole) of iodine, and 210 g. (3.00 moles) of mixed pentenes were added, as in the first reaction. After 24 hours of additional reflux, the reaction mixture was worked up as above to obtain a yield of crude product of 102 g. This product was purified by vacuum distillation in a 30 cm., glass-helix packed column to obtain 65 g. of the cis- and trans-isomers of tricyclo-[7.1.0.0^{4,6}]-decane boiling at 42.5–44° C./4 mm. The product analyzed 87.6% carbon and 12.0% hydrogen as compared with calculated values of 88.2% carbon and 11.8% hydrogen. The proposed structure for the compound was confirmed by inspection of the infrared spectrum of the product.

EXAMPLE 2

In this example, tricyclo-[7.1.0.0^{4,6}]-decane was subjected to inspection tests in order to show that the thermal and physical properties of this compound make it suitable for use in the operation of reaction type power plants. The results of these tests are given in Table I.

*Table I*

THERMAL AND PHYSICAL PROPERTIES OF TRICYCLO-[7.1.0.0^{4,6}]-DECANE

| | |
|---|---|
| Hydrogen/carbon ratio | 0.134. |
| Luminometer number | 23.1. |
| Heat of combustion, B.t.u./lb., net | 18,474. |
| Heat of combustion, B.t.u./gal., net | 142,697. |
| Freezing point, °F. | +50° F. |
| Viscosity, cs. at 99° C. | 1.1. |
| Thermal Conductivity, B.t.u./hr.-ft.², °F./ft.: | |
| At 145.4° F. | 0.0666. |
| At 219.2° F. | 0.0640. |
| Density, g./ml. at 20° C. | 0.922. |
| Boiling point, °C. | 44° C./4 mm. |
| Thermal decomposition, °F. | 638. |

Heats of combustion were obtained with a Parr oxygen bomb calorimeter on both a weight and a volume basis following the ASTM D–240–57T procedure. The freezing point was determined using the ASTM–D–1477–57T procedure. Thermal conductivities were measured by the hot-wire method described by Cecil and Munch in Ind. Eng. Chem., 48, 437 (1956) and Cecil, Koerner, and Munch in Ind. Eng. Chem. Data Sheets, 2, 54 (1957). Density was determined at a temperature of 20° C. using a Lipkin bicapillary pycnometer. Viscosity was determined at 99° C. using the standard Cannon-Fenske capillary viscosimeter following the ASTM-D-445 procedure.

The luminometer number was obtained using a luminometer manufactured by the Erdco Engineering Corporation. The procedure for determining luminometer number involved burning the fuel in a luminosity lamp and measuring the temperature rise above the lamp for various luminosity readings. From a graph of luminosity reading vs. lamp temperature rise, the temperature rise for a luminosity reading of 45 was obtained. The same procedure was repeated to obtain temperature rise values at a luminosity reading of 45 for isooctane and tetralin which serve as reference points of 100 and 0, respectively. The luminometer number was then obtained by dividing the difference between the temperature rise of the test fuel and the temperature rise of the tetralin by the difference in the temperature rise of isooctane and the temperature rise of tetralin multiplied by 100.

The thermal decomposition temperature was obtained using a high temperature, high pressure isoteniscope which consists of a Monel bomb capped at one end and connected to a precision pressure gauge by a Monel bomb diaphragm. The test fuel was heated within the bomb to an elevated temperature under high pressure and the temperature measured at which the fuel began to decompose and give off gas as determined by the change of pressure within the bomb. In this method, the formation of deposits in the decomposition reaction is not measured because some fuels may start to decompose to gas before forming deposits.

The above examples indicate that tricyclo-[7.1.0.0$^{4,6}$]-decane is very suitable for use in various reaction type power plants. This particular fuel has a very high heat of combustion on both a weight basis and a volume basis and may therefore be advantageously employed in jet propulsion type engines and turbine type engines where fuels of extremely high energy are desired on either a weight basis or a volume basis.

The tricyclo-[7.1.0.0$^{4,6}$]-decane of this invention is also characterized by unusually high thermal stability when employed as a fuel for a reaction type power plant. This factor is of importance not only in the actual combustion taking place in the engine but also in the fuel system prior to the burning step. For example, it is necessary in high speed aircraft to use a fuel reservoir to absorb the aerodynamic heat which builds up faster than can be dissipated to the atmosphere and thereby the fuel is heated to a temperature of 500° F. or higher. If degradation of the fuel occurs, gum and coke are deposited in the fuel system, thereby seriously hampering the smooth flow of the fuel from the reservoir to the combustion zone.

In operating reaction type power plants with the new hydrocarbon fuels of this invention, the fuel and an oxidizing agent are admixed together to form a combustible mixture which is then ignited either by a spark ignition device or by the burning fuel itself. The fuel compositions of this invention are not limited to use with particular oxidizing agents and almost any oxidizing agent known to those skilled in the art can be used. Ordinarily, in most aircraft applications using turbo-prop, turbo-jet, pulse-jet, and gas turbine engines, the oxidizing agent is air which is compressed either by a chemical compressor or aerodynamically. Also, in automotive and in ship applications, the oxidizing agent will ordinarily be air. In contrast to these applications, the oxidizing agent will usually be liquid oxygen or another chemical oxidizer, for example, fuming nitric acid, hydrogen peroxide, fluorine, and the like in guided missile and rocket applications. In some applications, a mixture of oxidizing agents will also be useful.

The fuel compositions of the present invention may be present with other materials such as gasoline, kerosene, mixtures of gasoline and kerosene, other aviation fuels and with the presently available jet fuel to produce an improved fuel composition. More particularly, the fuel described herein may be added to the present aliphatic hydrocarbon fuels having a heat of combustion of about 112,000 B.t.u./gal. to raise the overall heat of combustion thereof to at least about 125,000 B.t.u./gal. Moreover, the fuels described herein may be used in combination with fuel additives to improve various characteristics of the fuel, including liquid viscosity, burning characteristics, and the like.

In the operation of reaction type power plants using the fuel composition of this invention, the fuel and the oxidizing agent are charged into the combustion chamber in a proportion which gives rise to a combustible mixture. Where the oxidizing agent is air, the fuel-air ratio will ordinarily be maintained between 0.005 and 0.15. The particular fuel-air ratio used will be dependent not only upon the power requirements at the moment but also upon the nature of the engine. Thus, turbo-jet engines are preferably operated on a fuel-air ratio of about 0.01 to 0.03 whereas ram-jet engines are usually operated at a fuel-air ratio of 0.03 to 0.07.

Reasonable variation and modification of the invention as described are possible, the essence of which is that there have been provided (1) tricyclo-[7.1.0.0$^{4,6}$]-decane as a new compound, (2) methods for preparing said tricyclo-[7.1.0.0$^{4,6}$]-decane, (3) high energy fuel compositions containing said tricyclo-[7.1.0.0$^{4,6}$]-decane as an essential ingredient, (4) improved methods of developing thrust, and (5) methods of operating reaction type power plants.

I claim:

1. The method of developing thrust in a reaction chamber, said method comprising oxidizing a hydrocarbon fuel composition comprising, as an essential ingredient tricyclo-[7.1.0.0$^{4,6}$]-decane in said reaction chamber to produce a mass of high temperature gases and exhausting said gases from said reaction chamber so as to develop a high thrust.

2. The method of operating a reaction type power plant, said method comprising injecting a stream of an oxidizing agent and a stream of a hydrocarbon fuel comprising, as an essential ingredient, tricyclo-[7.1.0.0$^{4,6}$]-decane into the combustion chamber of said reaction type power plant, oxidizing said fuel in said combustion chamber and exhausting the resulting gases from said combustion chamber so as to impart thrust.

3. The method of operating a jet propulsion engine, said method comprising injecting a stream of an oxidizing agent and a stream of a hydrocarbon fuel comprising, as an essential ingredient, tricyclo-[7.1.0.0$^{4,6}$]-decane into the combustion chamber of said jet propulsion engine, oxidizing said fuel in said combustion chamber and exhausting the resulting gases in a rearward direction from said combustion chamber so as to impart thrust to said jet propulsion engine.

4. The method of operating a gas turbine engine, said method comprising injecting a stream of an oxidizing agent and a stream of a hydrocarbon fuel comprising, as an essential ingredient, tricyclo-[7.1.0.0$^{4,6}$]-decane into the combustion chamber of said gas turbine engine, oxidizing said fuel, and exhausting the resulting gases from said combustion chamber through a turbine to develop motive power.

5. The method of operating a turbo-jet engine, said method comprising injecting a stream of air and a stream of a hydrocarbon fuel comprising, as an essential ingredient, tricyclo-[7.1.0.0$^{4,6}$]-decane into the combustion chamber of said turbo-jet engine, burning said fuel in said combustion chamber, exhausting the resulting gases from said combustion chamber through a turbine to expand the same and compress the air supplied to said combustion chamber, and passing the gases into the atmosphere by way of a nozzle to impart thrust to said engine.

6. The method of operating a turbo-jet engine which comprises injecting a stream of air and a stream of tricyclo-[7.1.0.0$^{4,6}$]-decane spirol-[2.5]-octane into the combustion chamber of said engine, effecting combustion in said chamber, and exhausting the resulting gases from said combustion chamber through a turbine to expand the same and compress the air supplied to said combustion chamber, and passing the gases into the atmosphere by way of a nozzle to impart thrust to said engine.

References Cited in the file of this patent

UNITED STATES PATENTS

| | | |
|---|---|---|
| 2,765,617 | Gluesenkamp et al. | Oct. 9, 1956 |
| 2,766,301 | Buchner et al. | Oct. 9, 1956 |
| 2,826,037 | Scott et al. | Mar. 11, 1958 |
| 2,937,211 | Ludwig | May 17, 1960 |

OTHER REFERENCES

Hackh's Chemical Dictionary, 3rd ed. (1950), The Blakiston Co., Philadelphia, pp. 166, 241, 534.